US012060993B2

(12) United States Patent
Janniello

(10) Patent No.: US 12,060,993 B2
(45) Date of Patent: Aug. 13, 2024

(54) FLOATING WICK

(71) Applicant: James P Janniello, Sarasota, FL (US)

(72) Inventor: James P Janniello, Sarasota, FL (US)

( * ) Notice: Subject to any disclaimer, the term of this patent is extended or adjusted under 35 U.S.C. 154(b) by 510 days.

(21) Appl. No.: 17/333,927

(22) Filed: May 28, 2021

(65) Prior Publication Data

US 2022/0120437 A1 Apr. 21, 2022

Related U.S. Application Data

(60) Provisional application No. 63/001,891, filed on Mar. 30, 2020.

(51) Int. Cl.

*F23D 3/24* (2006.01)
*C11C 5/00* (2006.01)
*F23D 3/30* (2006.01)

(52) U.S. Cl.

CPC ................ *F23D 3/24* (2013.01); *C11C 5/006* (2013.01); *F23D 3/30* (2013.01); *F23D 2900/31012* (2021.05)

(58) Field of Classification Search

CPC ........................................................ F23D 3/38
See application file for complete search history.

(56) References Cited

U.S. PATENT DOCUMENTS

| | | | | |
|---|---|---|---|---|
| 1,050,913 A * | 1/1913 | Bradfield | F21L 19/00 | 431/206 |
| 4,013,397 A * | 3/1977 | Neugart | F23D 3/24 | 431/291 |
| 4,234,303 A * | 11/1980 | Neugart | F23B 7/00 | 431/291 |
| 4,529,376 A * | 7/1985 | Cafolla | F21S 13/00 | 431/298 |
| 6,688,880 B1 * | 2/2004 | Pangle | F23D 3/16 | 431/290 |
| 9,400,103 B1 * | 7/2016 | Cap | F23D 3/24 | |

FOREIGN PATENT DOCUMENTS

| | | | | |
|---|---|---|---|---|
| DE | 2539760 A * | 3/1977 | C11C 5/006 |
| DE | 202004014334 U1 * | 12/2004 | C11C 5/006 |
| DE | 102004001966 A1 * | 5/2005 | C11C 5/006 |
| DE | 202016000010 U1 * | 5/2017 | |
| WO | WO-2020171609 A1 * | 8/2020 | A61L 9/012 |

* cited by examiner

*Primary Examiner* — Jorge A Pereiro

(57) ABSTRACT

A candlewick includes a flotation device, a wick, and a bracket configured to position a first portion of the wick above a waterline of the flotation device and to position a second portion of the wick below a waterline of the flotation device.

16 Claims, 2 Drawing Sheets

FLOATING WICK

CLAIM OF PRIORITY

This application claims the benefit of priority under 35 U.S.C. § 119(e) of U.S. Provisional Patent Application Ser. No. 63/001,891, filed on Mar. 30, 2020, which is incorporated by reference herein in their entirety.

TECHNICAL FIELD

The present application relates generally to the mechanical arts, and more specifically, in one example, to a floating wick.

BACKGROUND

Candlewicks are conventionally embedded in a candle during manufacture while the candle wax is in a molten form. Once the wax hardens, the wick is maintained in a generally fixed position. If the wick fails, such as by burning off, the candle is often rendered useless. If the wick performs as intended, it must often be trimmed to a proper length by the user. In addition, the user is typically limited to the quantity and location of the wick(s) as determined at the time of manufacture of the candle. Similarly, wicks for kerosene lamps often have a fixed configuration, although the height of the wick above the surface of the kerosene may be mechanically adjustable.

BRIEF DESCRIPTION OF THE DRAWINGS

Some embodiments are illustrated by way of example and not limitation in the figures of the accompanying drawings in which.

DETAILED DESCRIPTION

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and mechanical and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
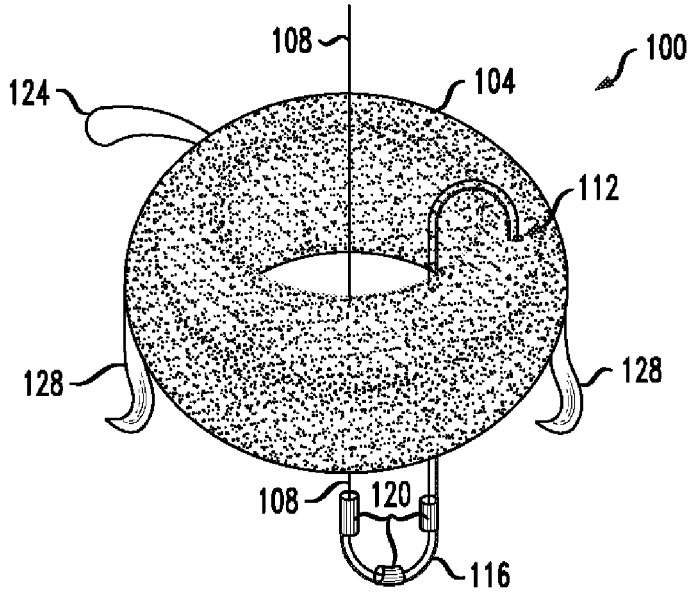
FIG. 1 is an illustration of a floating candlewick, in accordance with an example embodiment.
Figure 2:
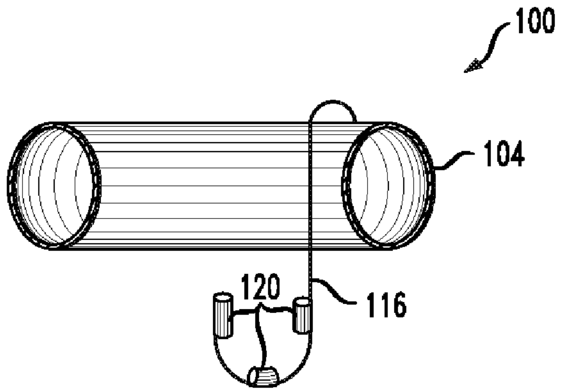
FIG. 2 illustrates a cross-sectional view of the floating candlewick of FIG. 1, in accordance with an example embodiment.

Generally, a floating wick, such as a floating candlewick, a floating kerosene wick, and the like, is described. FIG. 1 is an illustration of a floating candlewick 100, in accordance with an example embodiment. FIG. 2 illustrates a cross-sectional view of the floating candlewick 100 of FIG. 1, in accordance with an example embodiment. As illustrated in FIG. 1, a flotation device 104 provides a support structure for a wick 108 and provides buoyancy to float the floating candlewick 100 on molten wax, maintaining at least a portion of the wick 108 above the top surface of the molten wax and at least a portion of the wick 108 below the top surface of the molten wax (that is, within the molten wax). In one example embodiment, the flotation device 104 is in the shape of a hollow donut. Other shapes for the flotation device 104 are contemplated, such as a pair of parallel hollow logs, separated by a small distance (such as 0.5"), and joined by cross struts to form a generally rectangular or square shape. In one example embodiment, the flotation device 104 is constructed of an inflammable material, such as brass or aluminum. In one example embodiment, the floating candlewick 100, excluding the wick 108, is constructed of an inflammable material, such as brass or aluminum. A suitable range for the inner diameter of the flotation device 104 is approximately 0.25" and greater, although other sizes are contemplated. The interior volume of the flotation device 104 and, correspondingly, the outer diameter of the flotation device 104 may be determined using conventional calculations for determining floatation specifications based on the overall weight of the floating candlewick 100.

In one example embodiment, a hole 112 in the top of the flotation device 104 provides access to the interior of the flotation device 104 for storage of a portion of the wick 108. In one example embodiment, a grommet (not shown) is installed in the hole 112 to protect the wick 108 from the circular edge of the flotation device 104 that defines the hole 112. Other shapes for the hole 112 are contemplated, such as a square, a rectangle, an oval, and the like.

In one example embodiment, a bracket 116 is attached to the flotation device 104 to configure the wick 108 to 1) have one segment of the wick 108 below the waterline of the flotation device 104 (such as extending 0.5" below the waterline); and 2) have one end of the wick 108 above the waterline of the flotation device 104 (such as extending 0.5" above the waterline). (As used herein, the waterline is a line that connects the points of the flotation device 104 where the flotation device 104 meets the surface of the molten wax when the floating candlewick 100 is floating.) In one example embodiment, the bracket 116 is j-shaped. In one example embodiment, one or more tubes 120 configure, shape, and position the wick 108 in relation to the flotation device 104, as described above. In one example embodiment, the tubes 120 are short in length, such as 0.125". Short tubes 120 may be replaced with eyelets.

In one example embodiment, a handle 124 is attached to the top or side of the flotation device 104 to enable a user to remove the floating candlewick 100 from the wax. The exposed length of the wick 108 can then be adjusted to the desired length by pulling the wick 108 from the interior of the flotation device 104 or pushing the wick 108 into the interior of the flotation device 104. The floating candlewick 100 can then be embedded into the solid wax or floated on molten wax. In one example embodiment, the length of the tubes 120 is kept short, such as 0.25", such that any wax build-up within the tube 120 will not prevent movement of the wick 108 through the tube 120.

In one example embodiment, one or more prongs 128 extend from the flotation device 104, as illustrated in FIGS. 1 and 2. In one example embodiment, the length of each prong 128 is 0.5". The prongs 128 serve to mount the floating candlewick 100 into the surface of a solid block of wax. In one example embodiment, each prong 128 is in the shape of a corkscrew of a diameter that matches the outer circumference of the flotation device 104. In one example embodiment, the length of the corkscrew corresponds to an arc of less than 180 degrees, such as an arc of 22.5 degrees.

Figure 3A:
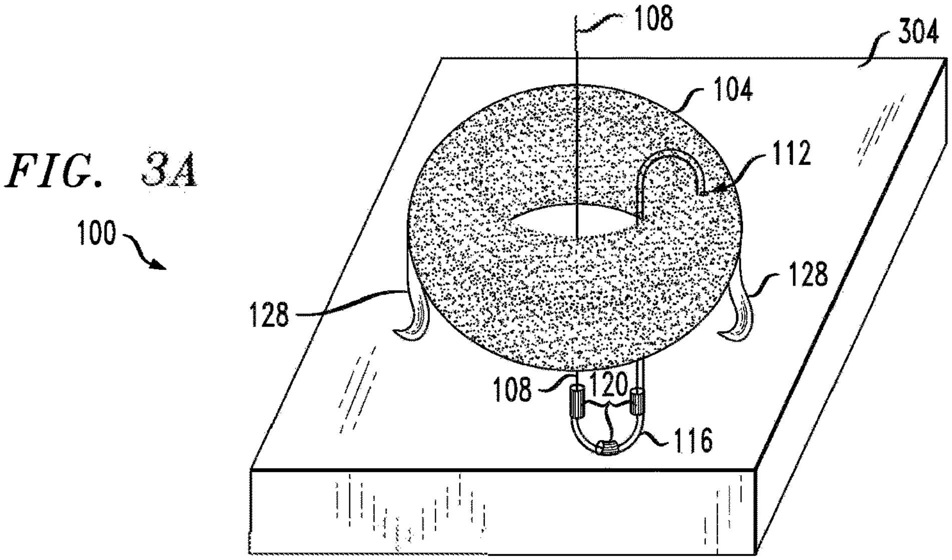
FIG. 3A is an illustration of the floating candlewick prior to embedding into solid wax, in accordance with an example embodiment.
Figure 3B:
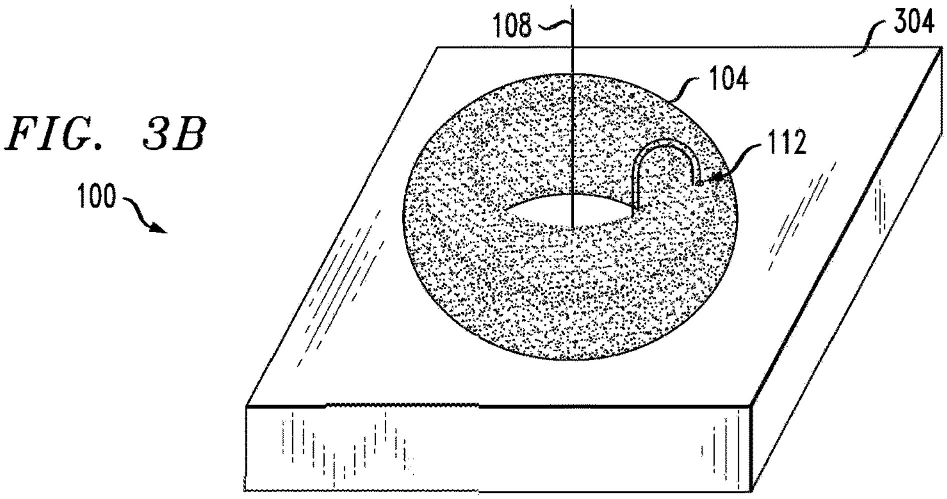
FIG. 3B is an illustration of the floating candlewick after embedding into the solid wax, in accordance with an example embodiment.

FIG. 3A is an illustration of the floating candlewick 100 prior to embedding into solid wax 304, in accordance with an example embodiment. To embed the floating candlewick 100, a user presses down on the flotation device 104 while rotating it clockwise. As the prongs 128 engage the solid wax 304, the prongs 128, the bracket 116, and the wick 108 become embedded in the wax, facilitated by the corkscrew shape of the prongs 128. FIG. 3B is an illustration of the floating candlewick 100 after embedding into the solid wax 304, in accordance with an example embodiment.

Figure 3C:
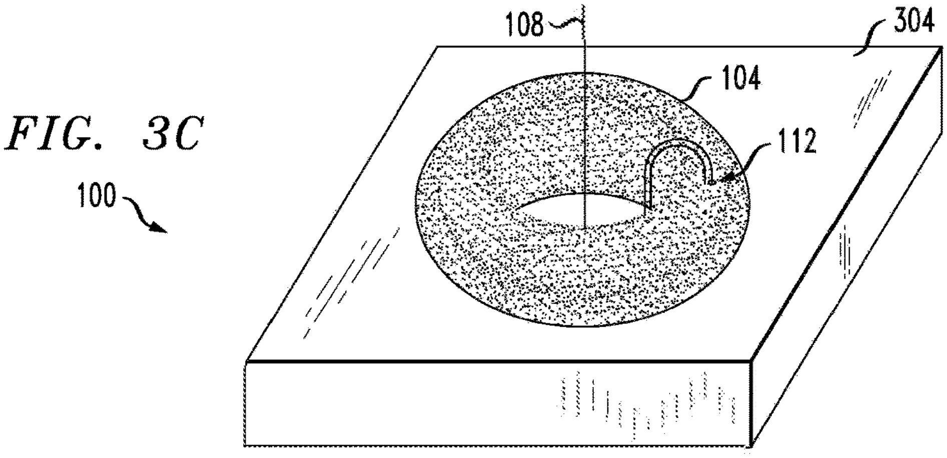
FIG. 3C is an illustration of the floating candlewick while floating in the solid wax, in accordance with an example embodiment.

After the wick 108 is lit with a match or other device, the wax surrounding the floating candlewick 100 melts. As the wax becomes molten, the floating candlewick 100 begins floating on the surface of the wax 304. FIG. 3C is an illustration of the floating candlewick 100 while floating in the solid wax 304, in accordance with an example embodiment.

Although certain examples are shown and described here, other variations exist and are within the scope of the invention. It will be appreciated by those of ordinary skill in the art that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A floating wick, the floating wick comprising: a flotation device; a wick; a bracket configured to position a first portion of the wick above a waterline of the flotation device and to position a second portion of the wick below the waterline of the flotation device, wherein the bracket is configured to inject a third portion of the wick into solid wax, the third portion comprising at least a portion of the second portion; and one or more prongs that extend from the flotation device and are configured to mount the floating wick into a surface of a block of wax, wherein each prong is configured in a shape of a corkscrew.

2. The floating wick of claim 1, wherein the flotation device is hollow and accommodates a fourth portion of the wick in an interior volume of the flotation device.

3. The floating wick of claim 1, wherein the waterline is a line that connects points of the flotation device where the flotation device meets a surface of molten wax when the floating wick is floating.

4. The floating wick of claim 1, the floating wick further comprising one or more tubes attached to the bracket, the one or more tubes configured to configure, shape, and position the wick in relation to the flotation device.

5. The floating wick of claim 1, wherein an exposed length of the wick is adjustable by pulling the wick from the interior of the flotation device or pushing the wick into the interior of the flotation device.

6. A floating wick, the floating wick comprising:

a flotation device;

a wick; and a bracket configured to position a first portion of the wick above a waterline of the flotation device and to position a second portion of the wick below the waterline of the flotation device, wherein the bracket is constructed of an inflammable material and is configured to inject and embed a third portion of the wick into solid wax, the third portion comprising at least a portion of the second portion; and the floating wick further comprising one or more prongs that extend from the flotation device, wherein the one or more prongs are configured to mount the floating wick into a surface of a block of wax, wherein each prong is configured in a shape of a corkscrew.

7. The floating wick of claim 6, wherein the flotation device is hollow and accommodates a fourth portion of the wick in an interior volume of the flotation device.

8. The floating wick of claim 6, the floating wick further comprising a grommet, the grommet residing in a hole in the flotation device to protect the wick from an edge of the flotation device, the edge defining the hole.

9. The floating wick of claim 6, wherein the waterline is a line that connects points of the flotation device where the flotation device meets a surface of molten wax when the floating wick is floating.

10. The floating wick of claim 6, wherein the bracket is j-shaped.

11. The floating wick of claim 6, the floating wick further comprising one or more tubes attached to the bracket, the one or more tubes configured to configure, shape, and position the wick in relation to the flotation device.

12. The floating wick of claim 6, the floating wick further comprising a handle, the handle being attached to the flotation device and configured to enable a user to lift the floating wick.

13. The floating wick of claim 6, wherein an exposed length of the wick is adjustable.

14. The floating wick of claim 13, wherein the exposed length of the wick is adjustable by pulling the wick from the interior of the flotation device or pushing the wick into the interior of the flotation device.

15. The floating wick of claim 6, wherein a diameter of the shape of the corkscrew equals an outer circumference of the flotation device.

16. The floating wick of claim 6, wherein a length of each prong corresponds to an are of less than 180 degrees.

* * * * *